Inventors
STANISLAUS JOSEPH RICKS
CHARLES EDWARD DOUGLAS
BY Ruege, Boyce + Bakelar
ATTORNEYS Patented Mar. 17, 1931

1,796,960

UNITED STATES PATENT OFFICE

STANISLAUS JOSEPH RICKS AND CHARLES EDWARD DOUGLAS, OF STRAND, LONDON, ENGLAND

MECHANICAL FILTER

Application filed March 28, 1930, Serial No. 439,626, and in Great Britain April 2, 1929.

This invention relates to filters of the kind which consist of a tank or casing circular in plan containing a bed of a substantial depth of filtering material, such as sand, and having on an upright shaft superposed sets of radial horizontal arms whereby on periodical rotation of the shaft the filtering material is intended to be broken up by the arms in their rotation in superposed horizontal planes, the arms for instance being hollow and conveying water to issue as jets from nozzles in the arms to assist in breaking up the filtering material.

The object of the invention is to provide a mechanical filter of the above described type in which the breaking up is more thoroughly effected than hitherto, and whereby thus the filtering material can be more readily and thoroughly washed by the usual upwardly directed jets from the nozzles of the usual nozzle plate on which the filter bed is supported.

It has already been proposed to provide stirrer arms to rotate in vertical planes on horizontal arms rotated above the surface of the filter bed, the rotation of the stirrers resulting merely from their contact with such surface which is thereby intended to be broken up. However such an arrangement affects only the filtering material at or close to the surface and has no breaking up effect on the bulk thereof.

Now according to the present invention, in a mechanical filter of the above described type and having the horizontal radial arms which are located and capable of being rotated in superposed horizontal planes, substantially directly superposed in the same vertical plane, i. e. directly above one another, stirrer arms rotatable in vertical planes are mounted on the horizontal arms and the whole is so intergeared that on rotation of the central shaft, the vertical stirrers on vertically successive arms rotate preferably in opposite directions.

Thus on the horizontal arms being rotated in horizontal planes they carry around therewith stirrers rotating in vertical planes, the stirrers at successive levels rotating in opposite directions. This action effectively breaks up and scours the filtering material in which the arms and stirrers are entirely immersed, whereas with horizontally rotating arms alone, the material tends to be merely carried around in lumps.

To complete the breaking up by dislodging the material at the periphery of the bed beyond the sweep of the horizontal arms, preferably nozzles are provided at the extremities of the arms, from which nozzles radial jets of water are directed against the wall of the tank or casing.

Preferably and advantageously, the vertically rotating stirrers of the arms at one level are staggered relatively to and overlap those of the arms above and beneath.

A constructional embodiment of the invention is illustrated by way of example on the accompanying drawings, in which :—

$a$ is a closed ended cylindrical tank or casing located with its axis upright.

Near the bottom of the tank $a$ is a partition or false bottom $b$, formed at close intervals with apertures in which are mounted short tubular plugs $c$ closed at their upper ends by metal gauze or perforated metal sheets.

The partition $b$ is in practice called a nozzle plate and the tubular plugs $c$ closed by gauze or perforated metal are called nozzles.

Vertically mounted above the nozzle plate $b$, on a footstep bearing $d^1$, is a hollow shaft $d$, formed in superposed sections. This hollow shaft $d$ extends through a stuffing box $e$ at the top of the tank $a$, above which it has keyed thereon a bevel wheel $f$.

At superposed intervals the hollow shaft $d$ is formed with bosses $d^2$, which provide bearings in which directly superposed hollow horizontal transverse shafts $g$ are journalled. Socketted on the outer ends of the transverse shafts $g$ are hollow radial arms $h$ terminating each in a radially directed nozzle $i$ and provided at intervals with stirrer arms $j$. The nozzles $i$ are provided with outwardly opening non-return valves $i^1$.

Extending coaxially within the upper portion of the hollow shaft $d$, is a shaft $k$, having a bevel wheel $l$ keyed on its upper end and passing through a stuffing box $m$ at the upper end of the shaft $d$.

On the lower end of the inner shaft $k$ is keyed a bevel wheel $n^1$, which gears with a bevel wheel $o^1$ keyed on the uppermost transverse shaft $g$. The bevel wheel $o^1$ in turn gears with a bevel wheel $p^1$ keyed on the upper end of a short shaft $k^1$ in alignment with the shaft $k$. At the lower end of the short shaft $k^1$ is keyed a bevel wheel $n^2$ which gears with a bevel wheel $o^2$ keyed on the intermediate transverse shaft $g$. This bevel wheel $o^2$ also gears with a bevel wheel $p^2$ keyed on the upper end of a short shaft $k^2$, coaxial with the shaft $k$, and on the lower end of which is keyed a bevel wheel $n^3$ which gears with a bevel wheel $o^3$ keyed on the lowermost transverse shaft $g$.

The bevel wheel $f$ at the top of the hollow shaft $d$ is in gear with a bevel wheel $q^1$ keyed on a horizontal shaft $q$, and the bevel wheel $l$ at the top of the inner shaft $k$ is in gear with another bevel wheel $q^2$ keyed on the shaft $q$.

On rotation of the shaft $q$, through the gearing above described the hollow shaft $d$ is rotated and the radial arms $h$ are carried around in the same direction, whereas the successive transverse shafts $g$ and radial arms $h$ with the stirrer arms $j$ thereon are rotated in opposite directions.

As usual in filter tanks, above the nozzle plate $b$ the filter tank $a$ is filled with sand up to the level indicated by the dotted line $r$.

Figure 1:
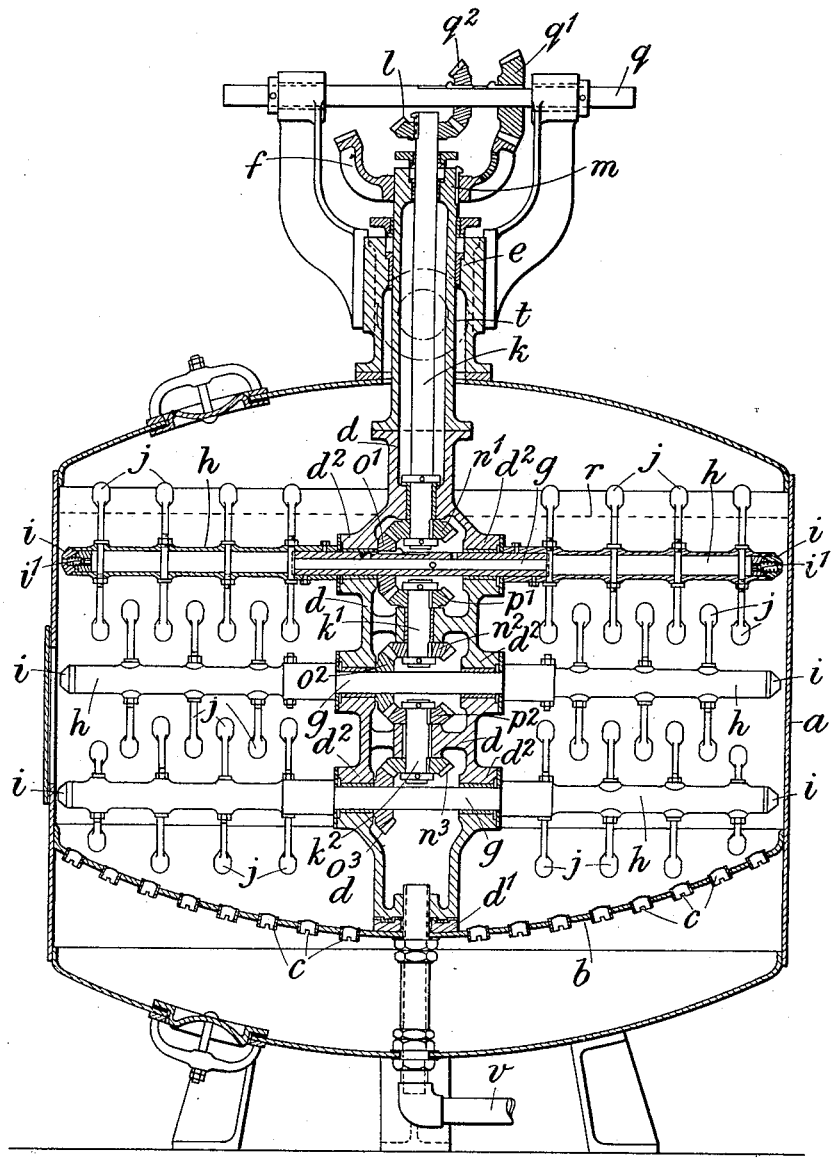
Fig. 1 is a vertical section of a mechanical filter.
Figure 2:
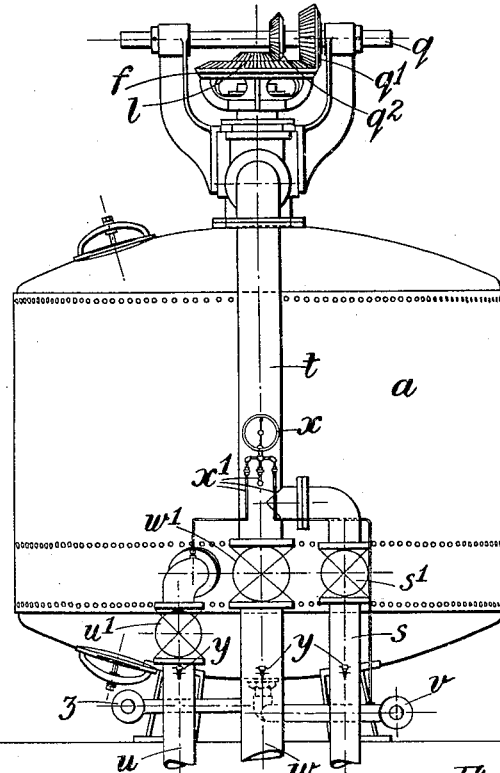
Figs. 2 and 3 are respectively an elevation and a plan of the filter shown on a smaller scale.
Figure 3:
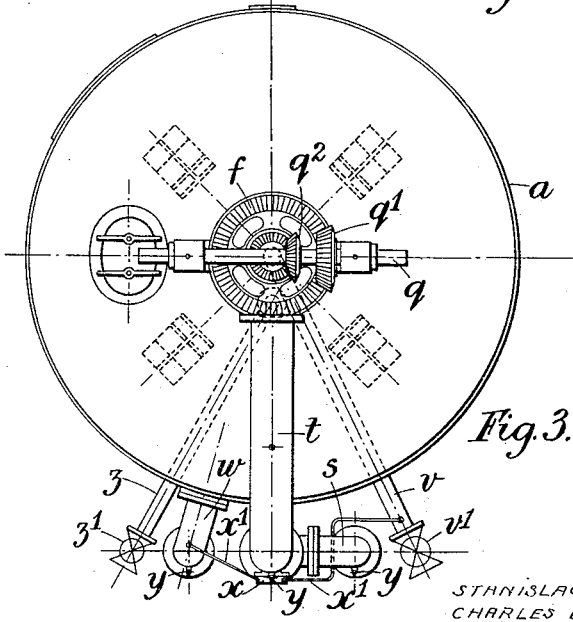

When the filter is in operation, raw (i. e. unfiltered) water is supplied under pressure or by gravity by a pipe $s$, Figs. 2 and 3, and passing through a cock $s^1$, passes into a pipe $t$ by which it is led into the top of the filter tank $a$.

The water, after passing through and being filtered by the filter bed of sand supported on the nozzle plate $b$ and passing through the nozzles $c$, escapes from the lower portion of the tank $a$ by an outlet pipe $u$ connected to the tank beneath the border of the nozzle plate $b$ but some distance above the dished bottom of the tank $a$. $u^1$ is a cock in the outlet pipe $u$.

$v$ is a pipe leading into the hollow shaft $d$ through the footstep bearing $d^1$ thereof, and controlled by a cock $v^1$.

When it is required to clean the sand in the tank $a$, the supply of raw water is cut off by closing the cock $s^1$, and the pipe $t$ is by a cock $w^1$ placed in communication with a drain pipe $w$. Water under pressure is then admitted into the tank $a$ by the outlet pipe $u$ and flows up through the nozzles $c$ and out through the pipe $t$ in the reverse direction to the normal filtering flow therethrough. At the same time water under pressure is admitted by the pipe $v$, on opening the cock $v^1$, into the hollow shaft $d$ and issues from the nozzles $i$ at the ends of the radial arms $h$. Also the driving shaft $q$ is rotated, thereby rotating the hollow shaft $d$ which thereby carries the radial arms $h$ around in superposed horizontal planes, and rotating the shaft $k$ to rotate the stirrer arms $j$ in vertical planes, the stirrer arms $j$ of successive radial arms $h$ rotating in opposite directions.

The above described action thoroughly breaks up the bed of sand and thus permits the jets of water issuing upwards from the nozzles $c$ to act on and cleanse practically every particle thereof whilst the jets from the nozzles $i$ detach and break up sand located against the inner peripheral surface of the tank beyond the range of the arms $h$.

The stirrer arms $j$ of the successive horizontal radial arms $h$ are mutually staggered and overlap as shown, thus avoiding localization of the stirring and breaking up effect.

$x$ is a pressure gauge which by means of cock-provided pipes $x^1$ can be placed selectively in communication with any of the pipes $t$, $u$ and $v$ to ascertain the pressure of the water therein.

$y$ are petcocks for enabling tests to be taken to ascertain the condition of the water in the pipes $s$, $u$ and $w$.

$z$ is a drain pipe controlled by a cock $z^1$ and connected to the lowest portion of the dished bottom of the tank $a$ to enable the filter to be entirely drained of water.

The tank $a$ may be open at the top instead of being closed.

The apparatus may be employed as a sand washer for washing sand to be used in other filters.

Claims:

1. In a mechanical filter, an upright cylindrical tank, a perforated false bottom in said tank, an upright shaft journalled in said tank, horizontal arms mounted at superposed intervals on and extending from said upright shaft above said false bottom, stirrer arms on and extending transversely from said horizontal arms, means for positively rotating said upright shaft about its axis, and means for positively rotating said horizontal arms about their axes.

2. In a mechanical filter, an upright cylindrical tank, a perforated false bottom in said tank, an upright hollow shaft journalled in said tank, horizontal hollow arms mounted at superposed intervals on and extending from said upright hollow shaft above said false bottom, a nozzle at the end of each said horizontal hollow arms, stirrer arms on and extending transversely from said horizontal hollow arms, means for positively rotating said upright hollow shaft about its axis, means for positively rotating said horizontal hollow arms about their axes, and means for admitting water to said upright hollow shaft.

3. In a mechanical filter, an upright cylindrical tank, a perforated false bottom in said tank, an upright hollow shaft journalled in said tank, horizontal transverse shafts journalled at superposed intervals in said upright hollow shaft above said false bottom, a bevel wheel on each of said horizontal transverse shafts, horizontal arms fast on said horizontal transverse shafts, stirrer arms on and extending transversely from said horizontal arms, an upright shaft extending coaxially within the upper portion of said upright hollow shaft, a bevel wheel on the lower end of said coaxially extending shaft and gearing with said bevel wheel on the uppermost of said horizontal transverse shafts, short shafts aligned with said coaxially extending shaft and extending within said upright hollow shaft each between two of said horizontal transverse shafts, a bevel wheel on each end of each of said short aligned shafts and gearing with one of said bevel wheels on said horizontal transverse shafts, and means for rotating said upright hollow shaft and said coaxially extending shaft.

4. In a mechanical filter, an upright cylindrical tank, a perforated false bottom in said tank, an upright hollow shaft journalled in said tank, horizontal hollow transverse shafts journalled at superposed intervals in said upright hollow shaft above said false bottom, a bevel wheel on each of said horizontal hollow transverse shafts, horizontal hollow arms fast on said horizontal hollow transverse shafts, a nozzle at the end of each of said horizontal hollow arms, stirrer arms on and extending transversely from said horizontal hollow arms, an upright shaft extending coaxially within the upper portion of said upright hollow shaft, a bevel wheel on the lower end of said coaxially extending shaft and gearing with said bevel wheel on the uppermost of said horizontal hollow transverse shafts, short shafts aligned with said coaxially extending shaft and extending within said upright hollow shaft each between two of said horizontal hollow transverse shafts, a bevel wheel on each end of each of said short aligned shafts and gearing with one of said bevel wheels on said horizontal hollow transverse shafts, means for rotating said upright hollow shaft and said coaxially extending shaft, and means for admitting water to said upright hollow shaft.

5. In a mechanical filter, an upright cylindrical tank, a perforated false bottom in said tank, an upright shaft journalled in said tank, horizontal arms mounted at superposed intervals on and extending from said upright shaft above said false bottom, stirrer arms on and extending transversely from said horizontal arms, said stirrer arms of said several horizontal arms being mutually staggered and overlapping, means for positively rotating said upright shaft about its axis, and means for positively rotating said horizontal arms about their axes.

6. In a mechanical filter, an upright cylindrical tank, a perforated false bottom in said tank, an upright hollow shaft journalled in said tank, horizontal hollow arms mounted at superposed intervals on and extending from said upright hollow shaft above said false bottom, a nozzle at the end of each said horizontal hollow arms, stirrer arms on and extending transversely from said horizontal hollow arms, said stirrer arms of said several horizontal hollow arms being mutually staggered and overlapping, means for positively rotating said upright hollow shaft about its axis, means for positively rotating said horizontal hollow arms about their axes, and means for admitting water to said upright hollow shaft.

7. In a mechanical filter, an upright cylindrical tank, a perforated false bottom in said tank, an upright hollow shaft journalled in said tank, horizontal transverse shafts journalled at superposed intervals in said upright hollow shaft above said false bottom, a bevel wheel on each of said horizontal transverse shafts, horizontal arms fast on said horizontal transverse shafts, stirrer arms on and extending transversely from said horizontal arms, said stirrer arms of said several horizontal arms being mutually staggered and overlapping, an upright shaft extending coaxially within the upper portion of said upright hollow shaft, a bevel wheel on the lower end of said coaxially extending shaft and gearing with said bevel wheel on the uppermost of said horizontal transverse shafts, short shafts aligned with said coaxially extending shaft and extending within said upright hollow shaft each between two of said horizontal transverse shafts, a bevel wheel on each end of each of said short aligned shafts and gearing with one of said bevel wheels on said horizontal transverse shafts, and means for rotating said upright hollow shaft and said coaxially extending shaft.

8. In a mechanical filter, an upright cylindrical tank, a perforated false bottom in said tank, an upright hollow shaft journalled in said tank, horizontal hollow transverse shafts journalled at superposed intervals in said upright hollow shaft above said false bottom, a bevel wheel on each of said horizontal hollow transverse shafts, horizontal hollow arms fast on said horizontal hollow transverse shafts, a nozzle at the end of each of said horizontal hollow arms, stirrer arms on and extending transversely from said horizontal hollow arms, said stirrer arms of said several horizontal hollow arms being mutually staggered and overlapping, an upright shaft extending coaxially within the upper portion of said upright hollow shaft, a bevel wheel on the lower end of said coaxially extending shaft and gearing with said bevel wheel on the uppermost of said horizontal hollow transverse shafts, short shafts aligned with said coaxially extending shaft and extending within said upright hollow shaft each between two of said horizontal hollow transverse shafts, a bevel wheel on each end of each of said short aligned shafts and gearing with one of said bevel wheels on said horizontal hollow transverse shafts, means for rotating said upright hollow shaft and said coaxially extending shaft, and means for admitting water to said upright hollow shaft.

9. In a mechanical filter, an upright cylindrical tank, a perforated false bottom in said tank, an upright shaft journalled in said tank, horizontal arms mounted on and extending from said upright shaft above said false bottom, stirrer arms on and extending transversely from said horizontal arms, means for positively rotating said upright shaft about its axis, and means for positively rotating said horizontal arms about their axes.

10. In a mechanical filter, an upright cylindrical tank, a perforated false bottom in said tank, an upright hollow shaft journalled in said tank, a horizontal transverse shaft journalled in said upright hollow shaft above said false bottom, a bevel wheel on said horizontal transverse shaft, horizontal arms fast on said horizontal transverse shaft, stirrer arms on and extending transversely from said horizontal arms, an upright shaft extending coaxially within the upper portion of said upright hollow shaft, a bevel wheel on the lower end of said coaxially extending shaft and gearing with said bevel wheel on said horizontal transverse shaft, and means for rotating said upright hollow shaft and said coaxially extending shaft.

In testimony whereof we have signed our names to this specification.

STANISLAUS JOSEPH RICKS.
CHARLES EDWARD DOUGLAS.